Patented Sept. 14, 1954

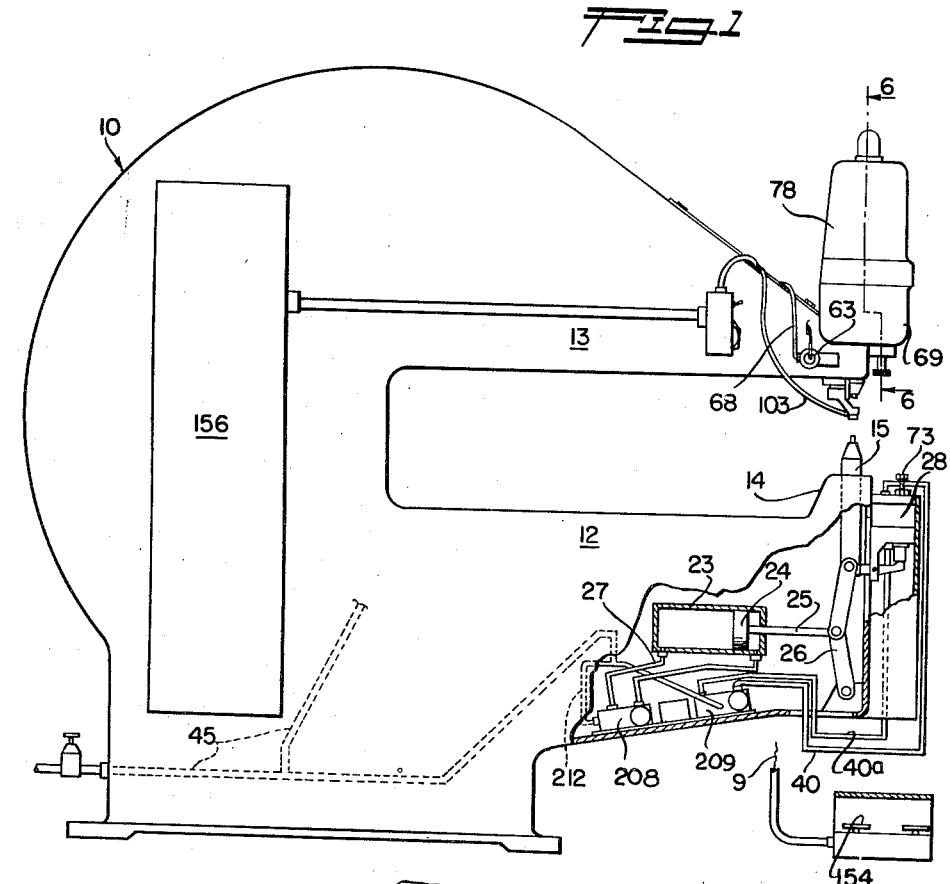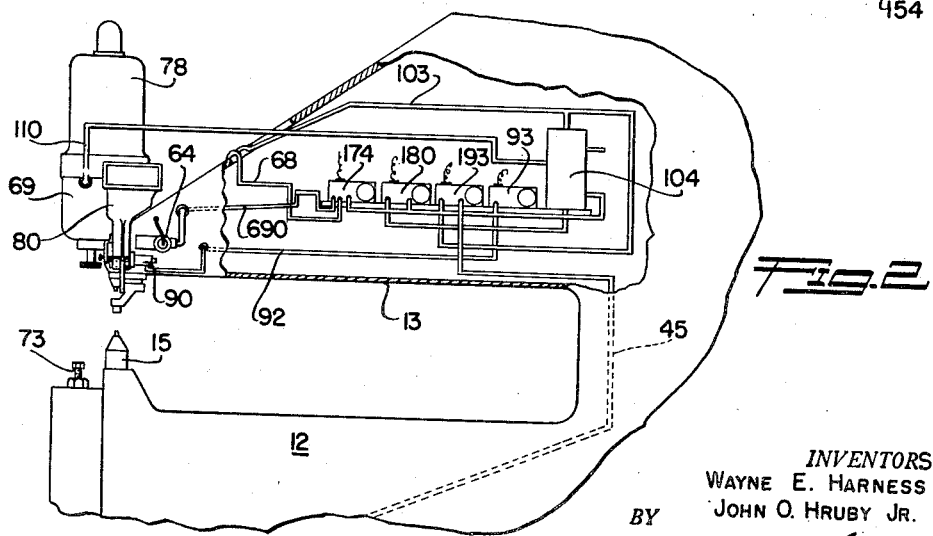

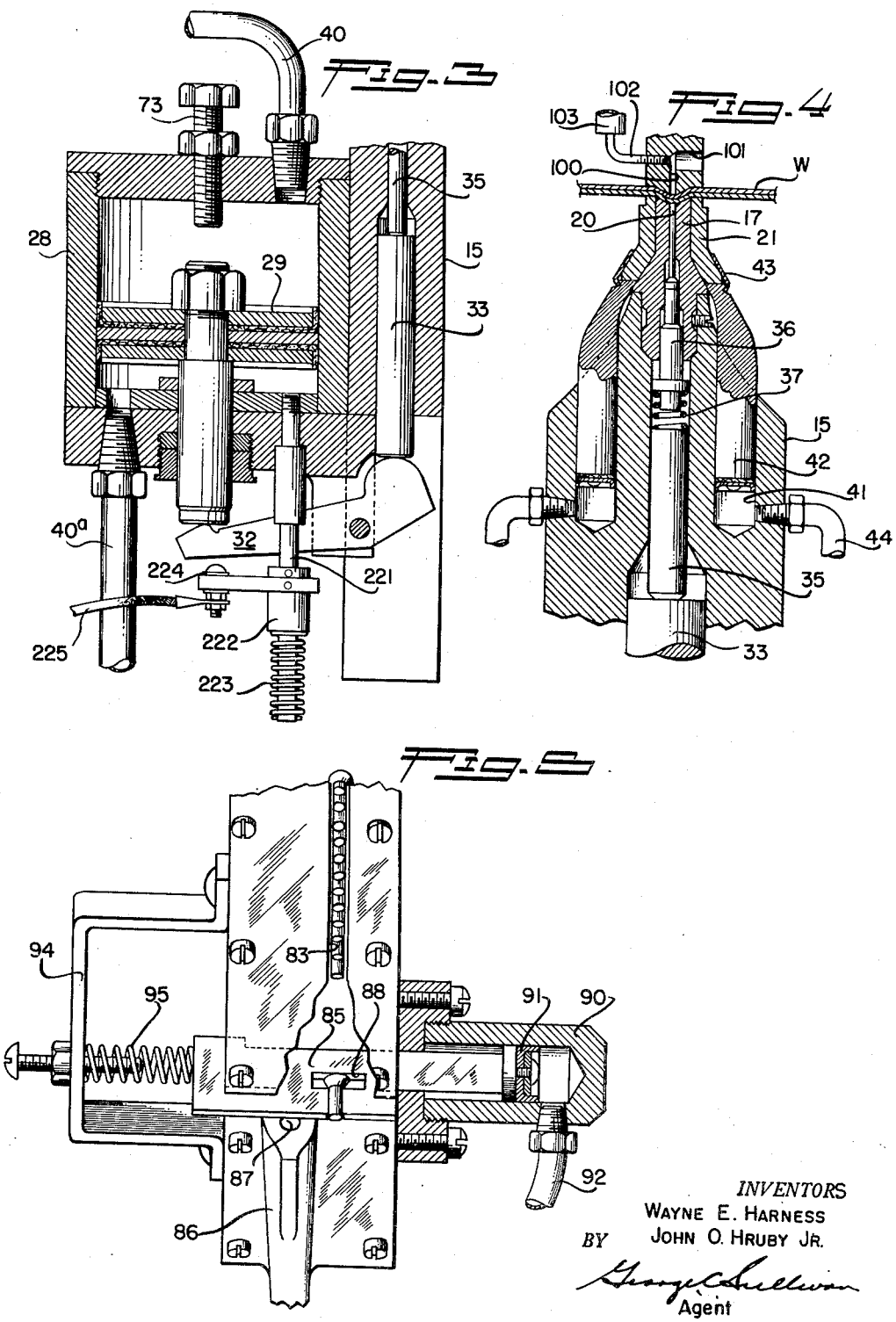

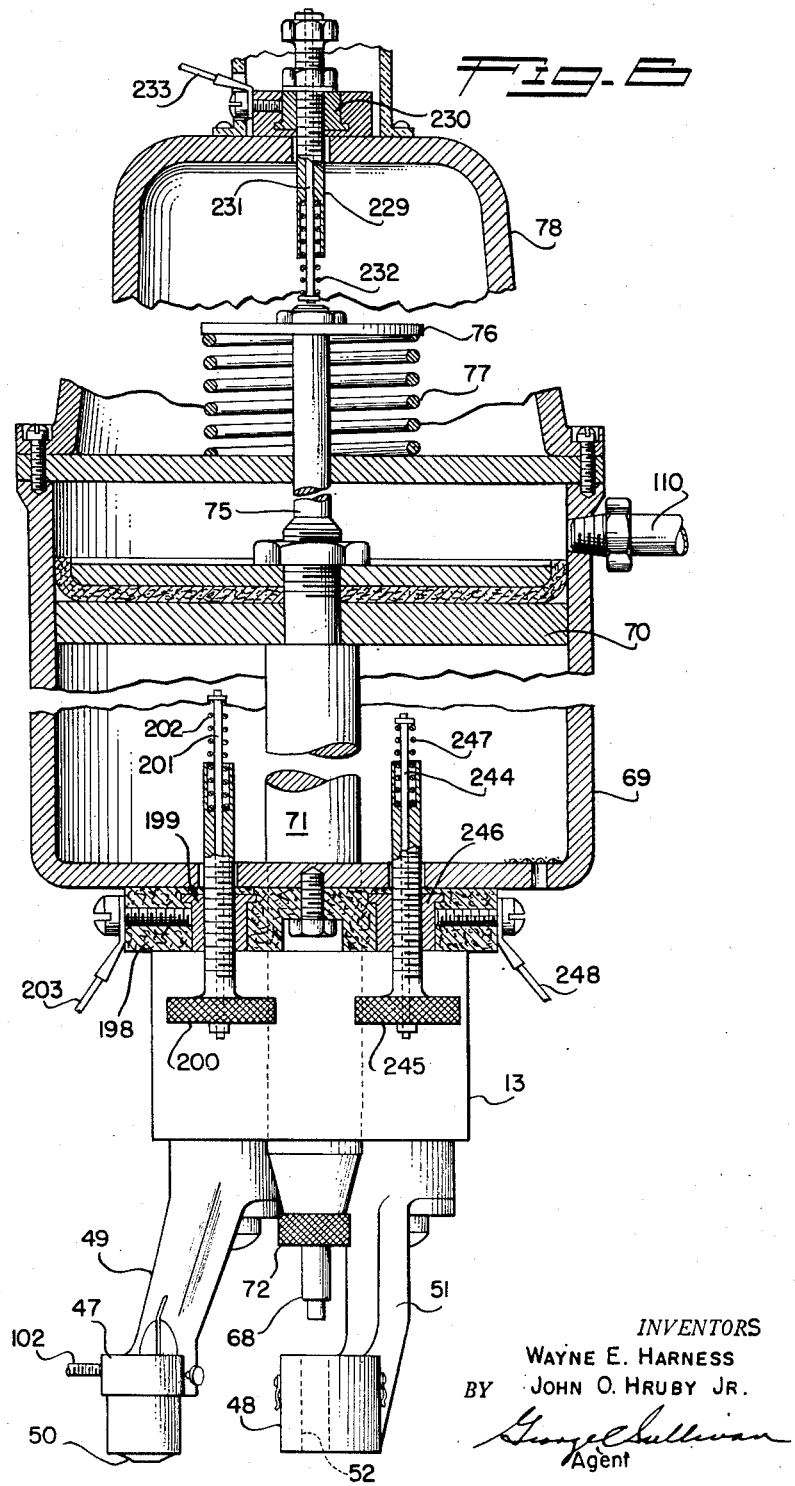

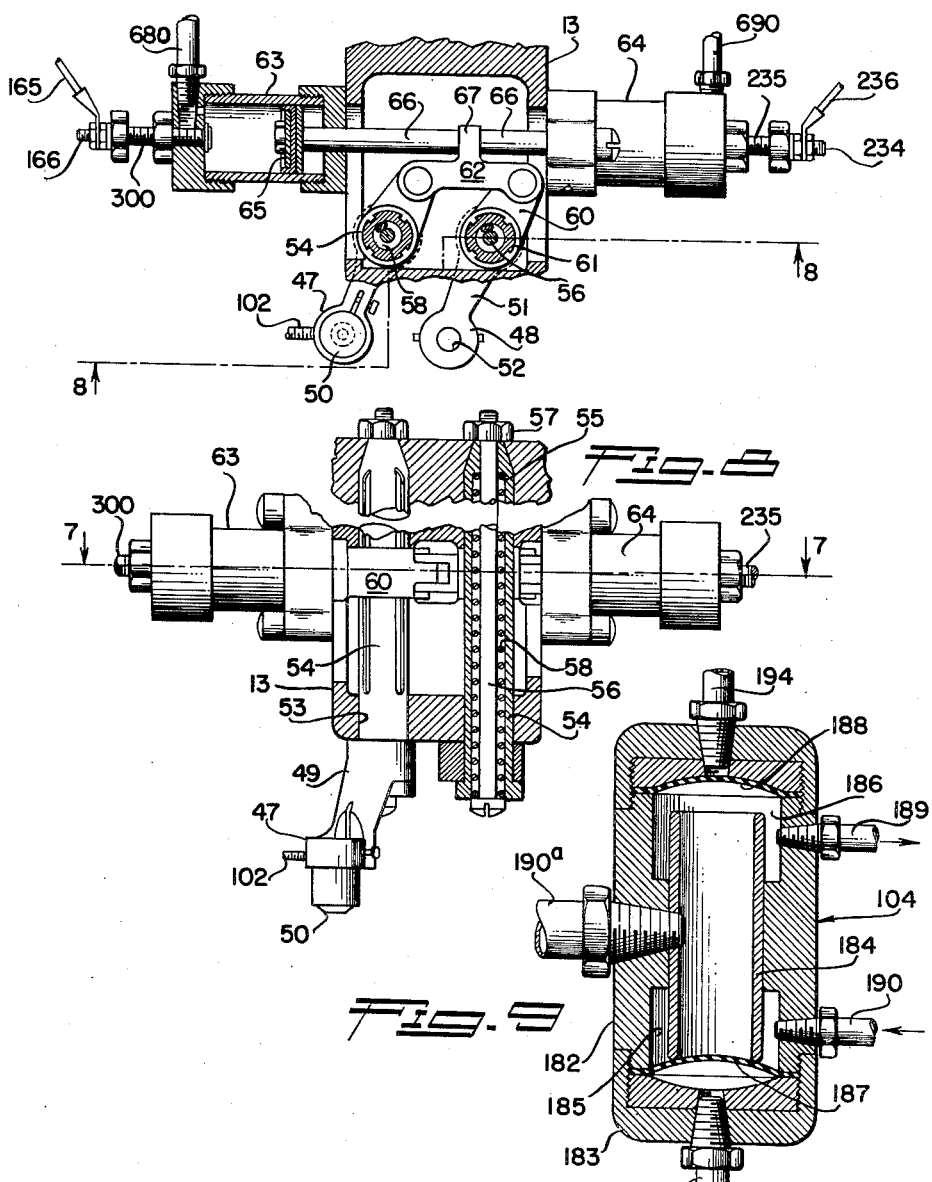

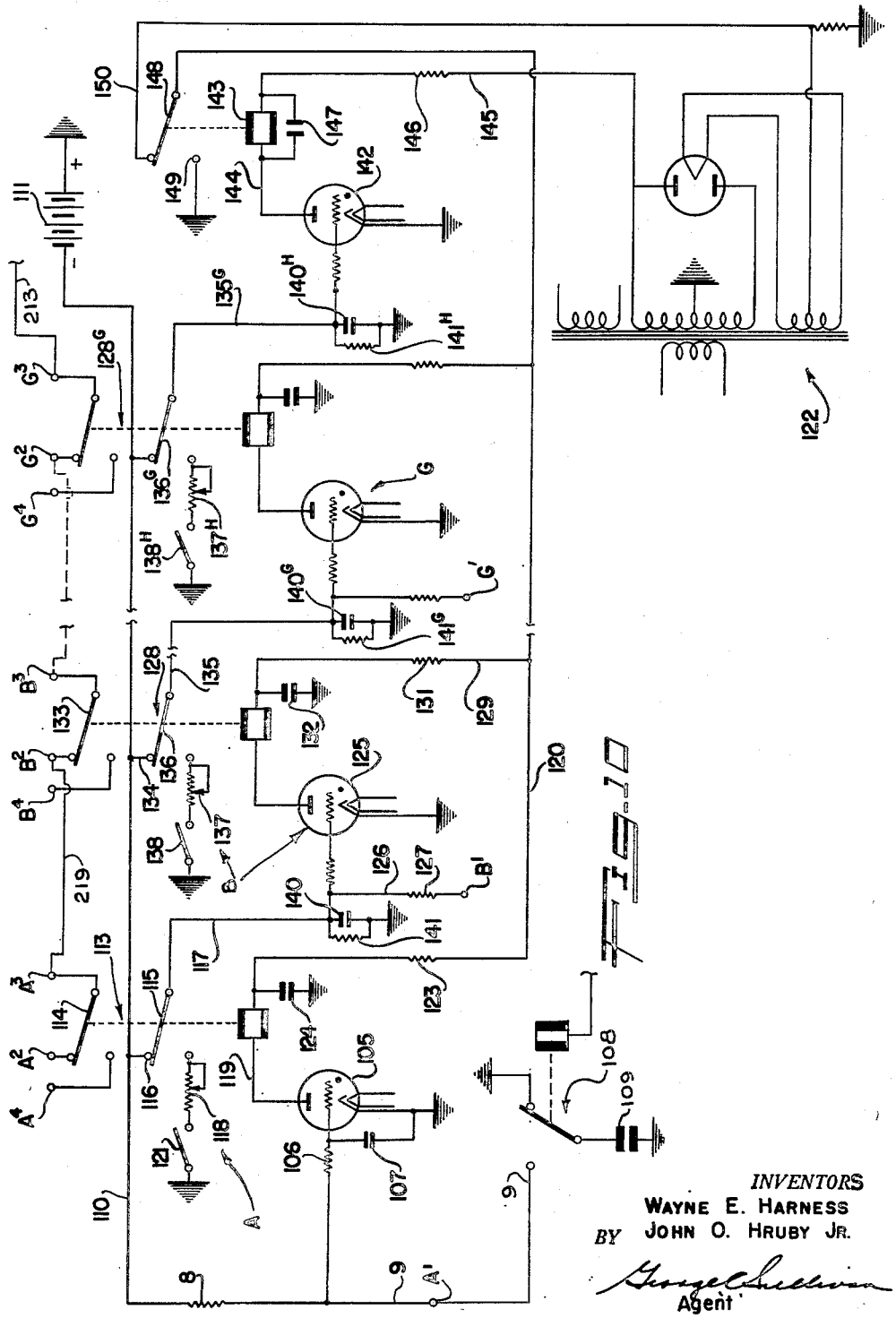

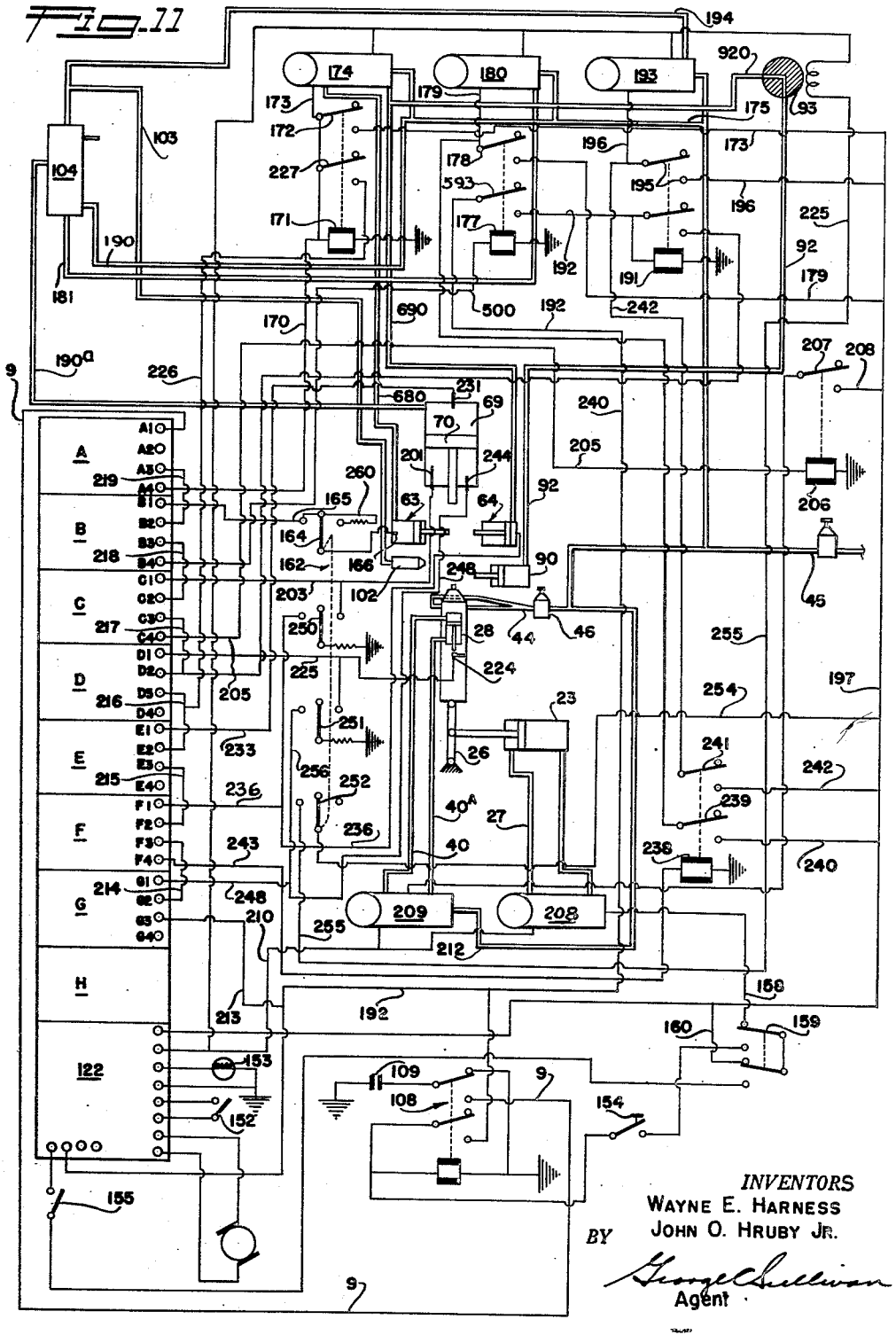

2,688,847

UNITED STATES PATENT OFFICE 2,688,847

ELECTRONIC CONTROL SYSTEM FOR AUTOMATIC MACHINES AND THE LIKE

Wayne E. Harness, North Hollywood, and John O. Hruby, Jr., Burbank, Calif., assignors to Lockheed Aircraft Corporation, Burbank, Calif.

Original application July 1, 1946, Serial No. 680,800, now Patent No. 2,620,876, dated December 9, 1952. Divided and this application January 23, 1952, Serial No. 267,878

7 Claims. (Cl. 60—97)

This invention relates to control apparatus and relates more particularly to electronic control systems for sequencing and timing pluralities of operations.

This application is a division of our copending application Serial No. 680,800, filed July 1, 1946, entitled Automatic Riveting Machine, now Patent No. 2,620,876, issued December 9, 1952.

There are many installations and machines where it is desirable or necessary to initiate and terminate the operations of several instrumentalities or mechanisms in sequency with or without time delays between the termination of one operation and the initiation of the next. For example, in our copending application referred to above, there is described a riveting machine embodying dimpling dies, punching means, rivet heading means, and other mechanisms that are operated in timed sequency to perform a complete riveting cycle or operation. Furthermore, in such machines and in machines of other types, it is often desirable to perform sub-sequences of operation. Thus, in a riveting machine the work parts may be dimpled and punched to merely receive the rivets or, instead, the rivets may be successively inserted in previously formed holes and then successively driven or headed up.

It is an object of the present invention to provide a fully automatic control for machines of various natures, and other mechanisms, having a plurality of units or devices that require timed sequential operation which control is electronic in nature and therefore extremely accurate and which is capable of effecting either an entire sequence of operations or of effecting one or more sub-sequences of operations. The control system embodies a conveniently located selector switch that may be manually operated or set to bring about either the complete sequence or the sub-sequence operations.

Another object of the invention is to provide a control system of this character that may be readily set or conditioned to adjust or control the extent of movement, or the like, of the various instrumentalities of the machine. For example, in a riveting machine the depth of the dimples made by the dimpling dies and the height of the driven rivets may be varied or changed at will by manually adjusting conveniently located knobs, or the like.

Another and important object of the invention is to provide a control system of this kind that is itself sequentially operated or energized by moving parts of the machine or mechanism being controlled; for example by pistons, levers, rams, or the like. The system includes manually regulable or adjustable switch means or contacts operated or engaged by the movable machine parts to terminate certain operations and to initiate subsequent operations, the manual adjustments serving to vary or change the stroke or length of movement of the parts.

Other objectives and features of the invention will be readily understood from the following detailed description of a typical preferred form of the invention wherein reference will be made to the accompanying drawings in which:

Figure 1 is a side elevation of a riveting machine incorporating features of the control system of the invention with certain parts broken away to show internal portions in vertical cross section;

Figure 2 is a fragmentary elevation of the other side of the machine with a portion broken away to illustrate certain valves and associated parts;

Figure 3 is an enlarged vertical sectional view of the punch actuating means;

Figure 4 is an enlarged fragmentary vertical section of the lower anvil assembly and associated parts showing a workpiece being dimpled;

Figure 5 is a fragmentary elevation view of the riveting feeding mechanism with a portion appearing in horizontal cross section;

Figure 6 is an enlarged vertical sectional view of the main cylinder taken substantially as indicated by line 6—6 on Figure 1;

Figure 7 is a horizontal sectional view taken substantially as indicated by line 7—7 on Figure 8;

Figure 8 is a vertical sectional view with certain parts appearing in elevation taken substantially as indicated by line 8—8 on Figure 7;

Figure 9 is an enlarged sectional view of the diaphragm valve;

Figure 10 is a wiring diagram of the electronic circuit means; and

Figure 11 is a combined wiring diagram and flow diagram of the principal circuits and fluid pressure actuated means.

The control system of the invention is, of course, useful with machines, apparatus and installations of various natures where it is desired to initiate and terminate the operations of plural units or instrumentalities in timed sequence. Accordingly, the invention is not to be considered as necessarily limited or restricted to association with the riveting machines of the class herein described, this application of the invention being typical and by way of illustration. In order to better describe the control system and its operation the riveting machine illustrated in the drawings will be described in a general way.

The machine includes a body 10 having a lower jaw 12 and an upper jaw 13 between which the work parts may be inserted. An upwardly projecting tubular boss 14 is provided on the lower jaw 12 adjacent its forward end and the active work engaging elements of the machine are arranged on the forward portions of the jaws 12 and 13. These elements include a die and anvil carrier 15 guided for vertical movement in the boss 14. The carrier 15 receives the shank of a die 17 and the upper end of the die is made concave and shaped to aid in forming the dimples in the workpiece and in setting up the rivets. An elongate punch 20 is slidably received in the tubular die 17. A tubular stripper 21 is slidable on the exterior of the die 17 and its upper face is adapted to engage the under side of the workpiece W. The carrier 15, the punch 20 and the stripper 21 are each individually operated by suitable power mechanisms, for example pneumatic cylinder and piston means. The means for operating the carrier 15 vertically comprises a cylinder 23, a piston 24 operable in the cylinder and toggle linkage 26 operated by the piston rod 25. This assembly is illustrated in Figure 1. Actuating air pressure lines 27 extend from the opposite ends of the cylinder 23 to a four-way solenoid valve 208 in the jaw 12.

The means for operating the punch 20 includes a cylinder 28 attached to the carrier 15 and a piston 29 operating in the cylinder and having a rod 30 extending from the lower end of the cylinder, as shown in Figure 3. A lever 32 is pivoted at the lower end of the cylinder 28 and has one end engaged by the piston rod 30 and its other end acting upwardly against a rod 33 guided in the carrier 15. Intermediate push rods 35 and 36, illustrated in Figure 4, are arranged between the rod 33 and the punch 20 to slide in the carrier and die 17. A spring 37 is engaged under compression between the rod 35 and an enlargement of the rod 36 to yieldingly support the punch 20 for retraction. The weight of the workpiece W is sufficient to compress the spring 37 and press the punch 20 downwardly and when the piston 29 is actuated downwardly the rods 33 and 35 move upwardly to compress the spring 37 until the upper end of the rod 35 engages the end of the rod 36 so that force is positively transmitted to the punch 20 to form an opening in the workpiece. Flexible lines 40 and 40ᵃ deliver actuating air under pressure to the opposite ends of the cylinder 28 and extend to a solenoid operated valve 209 in the jaw 12.

The stripper 21 is yieldingly urged upwardly to press against the underside of the workpiece W around the die 17. Vertical cylinder bores 41 are provided in the carrier 17 and rams 42 extend downwardly into the bores, as shown in Figure 4. The upper ends of the rams 42 are attached to the stripper 21 at 43. An air pressure line 44 supplies actuating air pressure to the bores 41 and extends from a main supply line 45.

The upper jaw 13 of the machine carries a dimpling shoe 47 and a riveting shoe 48, shown in Figures 6, 7 and 8. The shoe 47 has an upwardly sloping arm 49 and its offset lower portion removably carries a male dimpling die 50. The riveting shoe 48 has a similar arm 51 and its lower portion has a vertical opening 52. The shoes 47 and 48 are mounted for individual vertical movement and simultaneous horizontal shifting. Shafts 54 are slidable in spaced vertical openings 53 in the forward portion of the jaw 13. The arm 49 of the dimpling shoe 47 is fixed to one shaft 54 and the arm 51 of the riveting shoe 48 is secured on the other shaft. Spring means urge the shafts 54 to their upper positions where the shoes 47 and 48 are spaced clear of the work W. Bolts 56 extend through the tubular shafts 54 and are provided with nuts 57 for engaging the top surface of the jaw 13. Compression springs 58 surround the bolts 56 and are under compression between the lower heads of the bolts and internal shoulders 59 formed in the shafts.

The mechanism for shifting the shoes 47 and 48 includes lever arms 60 having sliding connections 61 with the shafts 54 so as to permit independent vertical movement of the shafts while remaining in rotation transmitting relation to them. The levers extend in parallel relation and their ends are pivotally connected with a link 62. The lever arms 60 and the links 62 are housed in the jaw 13 and piston mechanisms are supported on the jaw for shifting the link horizontally to move the shoes 47 and 48 between inactive positions and positions where they are in vertical alignment with the main ram 68. Horizontal cylinders 63 and 64 are secured to the opposite sides of the jaw 13 and have pistons 65 provided with rods 66 which extend into the jaw. The link 62 has a lug 67 extending between the opposing inner ends of the piston rods 66. Air pressure lines 680 and 690 supply air under pressure to the outer ends of the respective cylinders 63 and 64. The parts are related so that upon introducing air pressure to the cylinder 63 the riveting shoe 48 is brought to the active position in line with the main ram 68 and upon supplying air pressure to the cylinder 64 the dimpling shoe 47 is moved to the position in alignment with the main ram. The shifting of one shoe to the active position simultaneously moves the other shoe to the inactive position.

The means for actuating the main ram 68 includes a vertical cylinder 69 mounted on the jaw 13 where its longitudinal axis is coaxial with the die 17. A piston 70 operates in the cylinder 69 and has a rod 71 extending downwardly from the jaw 13. The lower end of the piston rod 71 carries a chuck 72 for the ram 68. The ram 68 is engageable with the male dimpling die 50 to drive the same downwardly against the work W when the shoe 47 is in the active position and is adapted to move downwardly through the riveting shoe 48 when the latter is in its active position to drive the rivet. The shank of the rivet is upset against the top of the punch 20 and the female die 17 so that vertical movement of the punch 20 controls the dimensions of the driven rivet. A stop screw 73, shown in Figure 3, is provided in the top of the cylinder 28 and is engageable by the piston 29 to limit downward travel of the punch 20. Adjustment of the screw 73 controls the position of the punch 20 for the riveting operation.

Referring again to the main cylinder 69, shown in Figure 6, a reduced stem 75 extends upwardly from the piston 70 and slides through an opening in the upper head of the cylinder. A washer 76 is secured on the upper end of the stem 75 and a spring 77 is arranged under compression between the cylinder head and this washer to return the piston 70 and punch 68 to the raised position when air pressure is released from the cylinder. A cap 78 on the cylinder 69 houses the projecting stem 75, spring 77 and disc 76.

The mechanism for feeding rivets to the riveting shoe 48, shown in Figures 2 and 5, includes a hopper 80 on the outer end of the jaw 13 for containing a supply of rivets and the hopper discharges into a track 83. A shiftable rivet selecting gate 85 is slidably arranged between the lower end of the track 83 and the upper end of a rivet discharging element 86. The element 86 has a passage 87 for guiding the rivets to the riveting shoe when the latter is in the retracted position. The passage 87 is offset horizontally from the track 83 and the gate 85 shifts the rivets one at a time from the track to the entrance of the passage. The gate 85 has a T shaped notch 88 for receiving an individual rivet and this notch is adapted to register with the track 83 to receive the rivet therefrom. Upon shifting of the gate the notch 88 comes into alignment with the passage 87 to discharge the rivet.

Cylinder and piston means is provided to shift the gate 85 to the rivet discharging position. A cylinder 90 is attached to the track assembly and the gate 85 has a piston 91 operating in the cylinder. A pressure line 92 communicates with the outer end of the cylinder and extends to a solenoid operated three-way valve 93. An air line 92a continues from the valve 93 to a valve 174, to be later described. A spring 95 is engaged under compression between a bracket 94 and the end of the gate 85 to restore the gate to the position shown in Figure 5 when the valve 174 is operated to discharge pressure from the cylinder 90.

Prior to each riveting operation a rivet is supplied to the shoe 48 by the track and gate means just described. This rivet is retained in the shoe 48 while the latter is shifted into alignment with the main ram 68 and until it is forced into the opening in the workpiece W. The workpiece W is securely clamped between the dies 17 and 50 during the punching operation and the punch 20 is operated upwardly to form the opening in the dimpled material. Figure 4 shows the parts in the position for the punching operation where it will be seen that the die 50 has an opening 100 for receiving the punch 20 as it moves upwardly. The punch 20 displaces slugs of material upwardly through the opening 100. A lateral opening 101 joins the upper end of the opening 100 and an air pressure nozzle 102 is threaded in the opening to discharge a stream of air across the top of the opening 100. An air pressure line 103 leads from a four-way diphragm valve 104 to the nozzle 102, the air supplied to the opening 101 serving to discharge or eject the slugs of material.

The elements thus far described are fluid pressure operated in the embodiment illustrated being pneumatically actuated, and the invention provides a versatile, dependable electronic control system for obtaining automatic, sequential and independent actuation of the several mechanisms to perform the dimpling, punching and riveting functions. Figures 10 and 11, and more particularly in Figure 10, we have illustrated what may be termed the internal electronic circuit which comprises an initiating stage A, a plurality of intermediate stages B, C, D, E, F and G, and a reset stage H. The initiating stage A includes a thyratron or gas filled triode tube 105 having a current limiting resistor 106 connected in its grid circuit and a surge protection condenser 107 tapped into the grid lead. A relay or switch means is provided to initiate firing of the tube 105. As shown in Figure 11, this means comprises a relay 108 which has normally open and normally closed contactors, and a condenser 109 is connected with the normally closed pole of the relay. A lead 9 extends from the normally open pole or contact of relay 108 to terminal $A^1$. The grid of tube 105 is connected with the lead 9. A D. C. power source 111 is provided to give bias for the control of the grids of the tubes in the various electronic stages. A common line 110 extends from the negative side of the bias source 111 to a limiting resistor 8 of high enough resistance to allow condenser 109 to temporarily bring the bias on tube 105 to a value low enough to render tube 105 conductive. Resistor 8 is connected between lines 9 and 110. Condenser 109 has a large value as compared with the value of condenser 107 and resistor 8 has a high value as compared with the value of resistor 106. Thus in a typical installation condenser 109 may have a value of 0.1 microfarad while condenser 107 may have a value of 0.01 microfarad and resistor 8 may have a value of ½ megohm while resistor 106 has a value of 2500 ohms. Prior to closing of the pedal operated switch 154 the condenser 109 is discharged through the normally closed contactor of relay 108. Manual operation or closing of the pedal switch 154 energizes relay 108 and the relay connects the discharge condenser 109 with terminal $A^1$ and lead 9 to reduce the potential on the grid of tube 105 to zero. This makes the tube 105 conductive.

The initiating stage A further includes a relay 113 having three posts or terminals $A^2$, $A^3$ and $A^4$ for connecting with external circuits, which will be later described. One side of the relay winding is tied into the plate of the tube 105 by line 119 and a lead 120 connects the other side of the winding with a suitable power supply 122 through a network 123—124, to be later described. One blade or contactor 114 of the relay is initially in a position where it electrically connects terminals $A^2$ and $A^3$, and upon energization of the relay, this connection is opened and the contactor connects terminals $A^3$ and $A^4$. The second movable blade or contactor 115 of the relay initially makes electrical connection between a terminal 116 tied into the bias source 111 through lead 110 and a lead 117. Upon energization of relay 113, contactor 115 breaks this connection and moves to a position where it connects the lead 117 with the terminal of a potentiometer 118. The other terminal of the potentiometer is connected with a grounded timing switch 121. A voltage limiting resistor 123 is interposed in the power line 120 and a peak charge condenser 124 is tapped off the line 120 to ground at a point between the resistor and the relay 113. The function of the above described elements will later become apparent.

The initiating stage A is associated with the first intermediate stage B to control actuation thereof. Referring again to Figure 10, intermediate stage B comprises a thyratron tube 125 having a lead 126 extending from its grid and provided with a current limiting resistor 127. The lead 126 extends to a terminal $B^1$ which has connection with an external circuit, to be later described. The relay 128 of the first intermediate stage B has one terminal of its actuating winding connected with the plate of tube 125 and a lead 129 connects the other terminal of the winding with the power line 120. A voltage limiting resistor 131 is interposed in the line 129 and a peak charge condenser 132 is connected to the line at a point between the relay coil and the resistor. The relay of stage B is similar to the relay of the initiating stage A and includes a blade or contactor 133 initially in a position where it connects terminals B² and B³. Upon energization of relay 128, the contactor 133 breaks this connection and electrically connects terminals B³ and B⁴. The second blade 136 of the relay initially makes connection between a terminal 134 in the bias line 110 and a line 135 extending to the timing resistor and condenser circuit of the next intermediate stage C. Upon energization of relay 128, the blade 136 breaks this connection and completes a circuit between said line 135 and a terminal of a timing potentiometer 137. A switch 138 is connected between the other terminal of potentiometer 137 and ground. The above described lead 117 extending from blade 115 of relay 113 connects with the grid lead of tube 125 and with a timing condenser 140. A maximum timing resistor 141 is associated with condenser 140. Condenser 140 and resistor 141 are operable to time-out the tube 125 as will be described below.

Now referring again to initiating stage A, it will be assumed that initiating relay 108 is operated to fire tube 105 as described above. In the event switch 121 is closed at this time, firing of tube 105 energizes relay 113 to complete a circuit through terminals A³ and A⁴ and to complete a circuit from condenser 140 through potentiometer 118 to ground. Completion of the circuit through the potentiometer discharges the charge in condenser 140 to the extent that tube 125 of the intermediate stage B becomes conductive to energize relay 128 of stage B. This timing-out of tube 125 is controlled primarily by potentiometer 118, resistor 141 being of an extremely high value with respect to the potentiometer. Thus it will be seen that if switch 121 is closed when relay 113 is energized, timing-out of the tube 125 is determined by the setting of potentiometer 118. In the event switch 121 is open when tube 105 of initiating stage A becomes conductive, energization of relay 113 brings the maximum timing circuit comprising condenser 140 and resistor 141 into play. Because of the high value of resistor 141, the tube 125 of stage B is held nonconductive for a substantial period for the purpose to be later described.

Intermediate stages C, D, E, F and G may be identical with intermediate stage B just described, and are related one to the other in the manner in which stage A is related to stage B. Accordingly, in order to simplify the disclosure, the details of stages C, D, E, F and G are omitted from the drawings, and in referring to the elements of these stages, reference numerals will be used corresponding to the reference numerals applied to corresponding elements of stage B with the respective exponents C, D, E, F and G added thereto. However, in the case of the external terminals of stages C, D, E, F and G, these are designated $C^1$, $C^2$, $C^3$ and $C^4$, $D^1$, $D^2$, $D^3$ and $D^4$, and so on, as clearly appears in Figure 11.

When lead 120 is energized before the machine is operated, condensers 124, 132 and $132^C$ to $132^G$ inclusive are charged to the maximum peak voltage of power supply 122. When tube 105 becomes conductive, the peak charge of condenser 124 is available for quick energization of relay 113. Upon energization of relay 113, the charge is partially drained off from the condenser and resistor 123 becomes part of a dividing network lowering the continuous voltage applied to relay 113. This allows the relay to remain energized without overheating. The peak voltage networks 131, $131^C$ to $131^G$, and 132, $132^C$ to $132^G$ of the several intermediate stages B to G inclusive, function in a similar manner when their respective tubes 125 and $125^C$ to $125^G$ inclusive become conductive.

The several stages A to G inclusive are interconnected in the following manner, as shown in Figure 11. A conductor or lead 213 extends from a power supply line 192 to terminal $G^3$ of stage G. Relay $128^G$ normally connects terminal $G^3$ with terminal $G^2$. An interconnecting line 214 connects terminal $G^2$ with terminal $F^3$ of stage F. Relay $128^F$ normally connects terminals $F^3$ and $F^2$, and an interconnecting line 215 joins terminals $F^2$ and $E^3$. Relay $128^E$ normally connects terminals $E^3$ and $E^2$ and an interconnecting line 216 joins terminals $E^2$ and $D^3$. Relay $128^D$ normally connects terminals $D^3$ and $D^2$, and a line 217 joins terminals $D^2$ and $C^3$. Relay $128^C$ normally connects $C^3$ and $C^2$, and a line 218 joins terminals $C^2$ and $B^3$. Relay 128 initially connects terminals $B^3$ and $B^2$ and a connecting line 219 joins terminals $B^2$ and $A^3$. Terminal $A^3$ is connected with terminal $A^2$ by the contactor 114 of relay 113 when the same is in its de-energized condition. It will be seen that this arrangement interlocks the several stages in such a manner that delivery of current to their respective terminals 2 and 4 depends upon the position of their relays.

The internal electronic circuit further includes a reset stage H for breaking the full wave D. C. voltage from the power source 122 to the tubes 105, 125, $125^C$, $125^D$, $125^E$, $125^F$ and $125^G$, and for discharging the several condensers 124, $132^C$, $132^D$, $132^E$, $132^F$, and $132^G$ to render the related tubes of stages A to G inclusive, nonconductive, thereby restoring these stages to their normal or initial condition. Reset stage H includes a gas-filled triode or thyratron tube 142 having a current resistor $127^H$ in the portion of its grid circuit extending to its terminal $H^1$. The lead $135^G$ from the relay blade $136^G$ of stage G taps into the grid lead, and extends to a timing condenser $140^H$. A maximum timing resistor $141^H$ is associated with the grounded condenser $140^H$. It will be seen from an inspection of Figure 10 that tube 142 of reset stage H becomes conductive in the same manner as the tubes 125 of the intermediate stages, either through the timing-out action of potentiometer $137^H$ or resistor $141^H$. The reset stage H further includes a relay 143 connected between the plate lead 144 of tube 142 and a lead 145 extending from the half-wave portion of power source 122. A current-limiting resistor 146 is interposed in lead 145 and a smoothing condenser 147 is connected in the lead across the winding of relay 143. The relay has a contactor or blade 148 connected with a terminal of above described line 120 and operable between a position where it engages a grounded pole 149 and a pole connected with a line 150 carrying full wave voltage from the power supply 122. When the relay 143 is in the de-energized condition, the blade 148 is in engagement with the terminal of line 150.

When the tube 142 is made conductive, as described above, the relay 143 breaks the full wave D. C. voltage circuit to the tubes 105, 125 and $125^C$ to $125^G$ inclusive. Energizing of relay 143 also brings the blade 148 into engagement with the grounded post 149 to discharge condensers 124, 132 and $132^C$ to $132^G$ inclusive, rendering the tubes of several stages A to G inclusive, nonconductive and allowing their related relays 113, 128 and $128^C$ to $128^G$ inclusive, to restore to their initial positions. Restoration of relay $128^G$ applies full negative voltage from source 111 to tube 142 of stage H, making the tube nonconductive. This restores relay 143 and completes the full sequence cycle. It will be observed that the internal electronic circuit is automatic upon closing of the switch 154 to carry out a full sequence of operations throughout the several stages A to H inclusive. A case 156 mounted on a side of the body 10 contains the above described electronic stages A to H inclusive, and the power supply means 122.

The external circuits of the system include a master switch 152 for controlling delivery of current to the power supply 122. An indicator lamp 153 may be connected with the power supply to indicate the position of the master switch. The above described initiating relay 108 is connected in series with a pedal operated switch 154 so constructed that depression of a pedal closes the switch. A safety switch 155 is also connected in series with the foot switch 154 and relay 108, and is operated to allow heating of the tubes of stages A to H inclusive. The above described solenoid valve 208 for controlling delivery of air under pressure to cylinder 23 has one lead 210 extending to the power supply and has another lead 158 extending to a switch 159 connected with a second power lead 160. The switch 159 is a double pole switch and is also connected in series with the foot switch 154, safety switch 155 and relay 108. Thus in order to condition the machine for operation, the switch 159 must be closed to actuate the piston 24, which brings the anvil or carrier 15 to its raised operative position.

With the switches 155 and 159 closed, the foot switch 154 is closed to initiate operation of the machine. Closing of the switch 154 energizes relay 108, which applies D. C. current to all stages A to H inclusive, of the internal electronic circuit, and applies a zero charge of the condenser 109 to the grid of the tube 105 of initiating stage A. As above described, this fires tube 105 and actuates relay 113 of stage A. A lead 170 extends from post A⁴ of stage A to a relay 171 which has a pole and blade 172 interposed in a power line 173 extending to a solenoid operated four-way valve 174. Upon firing of tube 105 of stage A, relay 171 is energized and solenoid valve 174 is reversed or operated. Solenoid valve 174 is operable to connect an air pressure supply manifold 175 with the pipe 690 leading to the right-hand shifting cylinder 64 so that the piston therein is operated to shift the dimpling shoe 47 into alignment with the main ram 68. This actuation of solenoid valve 174 also supplies air under pressure from manifold 175 to lines 920 and 92 leading to the above described rivet gate or selector cylinder 90. It will be seen that energization of stage A results in shifting of the dimpling shoe 47 into alignment with the main ram and delivery of a rivet into passage 87 of the rivet feed means.

A selector switch 162 is provided to either condition the internal electronic circuit for the full sequence of operations of the machine or for punching only, or for riveting only as desired. The switch 162 is interposed between the posts or terminals B¹, C¹ and D¹ of stages B, C and D, and certain external contacts embodied in the machine. A line 165 extends from post B¹ to a post of the switch 162 and the related switch blade 164 is engageable therewith to complete a circuit through a line 165 extending to an external contact 166. As illustrated in Figure 7, contact 166 is in the nature of a post extending through a tubular insulating screw 300 which, in turn, is threaded through an opening in the head of the left hand shift cylinder 63. The inner end of the contact 166 is engageable by piston 65.

The next phase of the operation is effected by engagement of the left-hand shift piston 65 with the above described contact 166. Contact 166 is connected with terminal B¹ of the first intermediate stage through the medium of line 165 and selector switch blade 164 so that engagement of the piston with the contact 166 grounds this circuit and thus renders the tube 125 conductive. The timing switch 121 of stage B is open at this time, and the maximum timing circuit 140—141 allows ample time for the grounding of circuit 164 and 165 as just described. The conductive tube 125 energizes relay 128 and contactor 133 comes into engagement with terminal B⁴. This energizes a relay 177 having a contactor 178 interposed in a lead 179 extending from a solenoid actuated four-way valve 180 to a common A. C. power lead 197. Valve 180 controls communication between the air pressure manifold 175 and a line 181, and communication between the line 181 and the atmosphere. Line 181 extends to one end of a diaphragm valve 104 illustrated in detail in Figure 5.

Diaphragm valve 104 includes a tubular body 182 provided at its ends with caps or heads 183. A partial partition in the body carries a tubular seat member 184 and defines two end chambers 185 and 186. The member 184 extends into these chambers and its end surfaces constitute annular seats which oppose the heads 183. Flexible diaphragms 187 and 188 are secured against the ends of the body 182 to extend across the chambers 185 and 186. The diaphragms are movable into and out of engagement with the adjacent ends of the seat member 184. An exhaust port 189 communicates with the inner portion of chamber 186 and an air pressure supply line 190, leading from manifold 175, communicates with the inner portion of chamber 185. It will be observed that the effective areas of the diaphragms 187 and 188 exposed to pressure introduced into the outer ends of the chambers 185 and 186, are considerably larger than the areas of the diaphragms exposed at the interior of the seat member 184 and the areas exposed around the seat member. Accordingly, pressure admitted to the outer end of a chamber holds the related diaphragm 187 or 188 engaged with the seat member 184 and resists comparable pressure within the seat member 184 or within the annular space surrounding the seat member. Release of pressure from an outer end of a chamber 185 or 186 allows the related diaphragm to open from the seat member. A pipe 190ᵃ communicates with the interior of the seat member 184 and extends to the upper end of the main cylinder 69.

When relay 177 is energized to reverse the solenoid actuated valve 180, pressure is relieved from line 181 and the outer end of chamber 185. This allows diaphragm 187 to move to the open position so that air under pressure pipe 190 flows through pipe 190ᵃ to the upper end of the main cylinder 69. Substantially simultaneously with this action, air under pressure is supplied to the outer end of chamber 186 to close the diaphragm 188 against seat member 184 and thus close off the exhaust 189.

The means for effecting reversal of diaphragm 188 includes a relay 191 energized upon actuation of relay 177. A lead 192 extends from the coil of relay 191 to the power supply 122 and the above described relay 177 has a contactor and pole combination 593 interposed in lead 192. Thus, upon energization of relay 177, relay 191 is also energized. Relay 191 controls a four-way solenoid actuated valve 193. Relay 191 has a blade and pole 195 interposed in a lead 196 extending from the supply line 197 to the solenoid of valve 193 so that energization of the relay operates or reverses the valve. Valve 193 governs a pipe 194 leading to the outer end of diaphragm valve chamber 186 to either connect the same with air pressure supply manifold 175 or the atmosphere. Energization of relay 191 reverses valve 193 so that air under pressure is supplied to pipe 194 and chamber 186. It will be seen that upon firing of tube 125, valves 180 and 193 are reversed to reverse the diaphragm valve 104 so that air under pressure is supplied to the upper end of the main cylinder 69 to actuate the ram 68 downwardly.

In accordance with the invention, means is provided for limiting the initial downward stroke of the main ram 68 so as to control the depth of the dimple formed in the work W, and the stroke-limiting means serves to initiate operation of the intermediate electronic stage C. A dimple depth contact is provided in the lower portion of the main cylinder 69 to be engaged by the piston 70 as it descends. A plate 198 of dielectric material is secured to the under side of cylinder 69 and carries a bushing 199. A tubular thumb screw 200 is threaded upwardly through the bushing and passes freely through an opening in the cylinder wall to enter the cylinder. An elongate contact stem 201 is slidable in the thumb screw 200 and has a head at its lower end for contacting the under side of the thumb screw knob. A spring 202 is engaged under compression between the screw 200 and a head on the upper end of the stem 201 to urge the stem upwardly. It will be seen that rotation of the screw 200 vertically positions or adjusts the contact stem 201. The knob of the screw 200 is conveniently accessible at the front of the machine so that the operator may readily vary or regulate the depth of the dimples to be formed.

A lead or conductor 203 is electrically connected with the contact stem 201 through the medium of the bushing 199 and screw 200, and extends to the post $C^1$ of the intermediate electronic stage C. When the main piston 70 moves into engagement with the contact stem 201, the grid circuit of stage C is grounded to make the tube $125^C$ conductive. This, in turn, energizes relay $128^C$ to bring the blade $133^C$ into contact with post $C^4$. A line 205 extends from terminal $C^3$ to a relay 206, a circuit for energizing relay 206 being completed through lead 205, contactor $133^C$ and post $C^3$. Relay 206 includes a post and contactor 207 interposed in a lead 208 extending from power line 197 to one side of the solenoid of a four-way valve 209. The other side of this solenoid is tapped into line 210 extending to the power supply 122. Valve 209 governs the above mentioned pipes 40 and $40^a$, which lead to the upper and lower ends respectively of the punch operating cylinder 28. When the solenoid of valve 209 is in the normal de-energized condition, the valve connects the pipe $40^a$ with an air pressure supply line 212 so that the piston 29 is held in the upper position. Upon reversal of the valve 209, effected by operation of relay 206, pipe 40 is put into communication with pressure line 212 and pipe $40^a$ is allowed to exhaust to atmosphere. This actuates piston 29 downwardly and the punch 20 is forced upwardly to form an opening in the dimpled workpiece. It is to be observed that air pressure is maintained in the main cylinder 69 at this time and the work W is tightly clamped between the dies 17 and 50 as it is punched. This assures the production of a true clean opening in the work with a minimum of distortion.

As described above, slugs S of the sheets or workpieces W are pushed upwardly through the opening of die 50 when the punch is operated. The invention provides for the delivery of air under pressure to the nozzle 102 to blow these slugs free. The above mentioned line or pipe 103 supplying the air nozzle 102 is in communication with the pipe 194 which extends between solenoid operated valve 193 and diaphragm valve 104. When the valve 193 is reversed to close off the exhaust 189 of the diaphragm valve, as previously described, air under pressure is also supplied to the nozzle 102 through line 103. A stream of air discharges from the nozzle 102 at a substantial velocity so long as the solenoid of valve 193 remains energized. Accordingly, the slugs S formed during the punching operation are blown clear through the opening 101 by the air blast as the punch approaches the upper end of its stroke.

At the instant the blade or contactor $133^C$ of stage C is operated toward post $C^4$, the circuit to the coil of relay of 177 is opened to de-energize the relay 177. The current to relay 177 is carried by relay 128, line 218, relay $128^C$ and a line 500 extending from post $B^4$ to the winding of the relay. When relay $128^C$ is energized, as just described, this circuit is broken between terminals $C^2$ and $C^3$. De-energization of relay 177 causes reversal of solenoid operated valve 180, which, in turn, seals off both ends of the diaphragm valve 104 to lock the ram 68 in its down or dimpling position. When blade $133^C$ moves into engagement with terminal $C^4$ a circuit is completed to the winding of relay 206 through lead 205. Energization of relay 206 energizes solenoid actuated valve 209 to supply air under pressure to cylinder 28 through line 40. This actuates the punch 20 to form an opening in the workpiece W.

The above described actuation of the punch 20 causes operation of electronic stage D, which in turn de-energizes relays 191 and 206. As shown in Figure 3, a rod 221 is attached to the cylinder 28 of the punch operating mechanism and a sleeve 222 is slidable on the rod. The sleeve is yieldingly urged upwardly by a spring 223. A projecting arm on the sleeve 222 carries an insulated contact 224 in position to be engaged by the lever 32 when the punch 20 reaches the upper end of its movement. A conductor 225 extends from contact 224 to the terminal $D^1$ of stage D. Upon engagement of the lever 32 with contact 224, the grid circuit of tube $125^D$ is grounded to discharge condenser $140^D$ and the tube is made conductive. This energizes relay $128^D$ to break the connection between terminals $D^2$ and $D^3$. This in turn de-energizes the relays 191 and 206. De-energization of relays 191 and 206 results in reversal of the solenoid operated valves 193 and 209 so that the spring 77 is free to restore the piston 70 to its raised position and to move the ram upwardly out of engagement with the die 50. Valve 209 is also reversed to cause the punch 20 to descend. Relay 171 remains energized at this time to hold valve 174 in the actuated position so that the dimpling die 50 remains in line with the ram 68. Relay 171 is locked in by a lead 226, tapped into the interconnecting line 216 and extending to a second contactor 227 of the relay, the contactor being connected with a pole of the relay winding.

The invention provides means whereby restoration of the ram 68 reverses the positions of the dimpling shoe 47 and the riveting shoe 48. A tubular screw 229 is adjustably threaded through a bushing 230 secured in a di-electric plate on the hood 78 of the main cylinder 69. A contact stem 231 is shiftable in the screw and extends downwardly into the hood. A spring 232 is engaged between the screw 229 and a head on the lower end of the stem 231 to urge the stem downwardly to its lowermost position. The stem 231 is engaged by the upper end of the rod 75 when the piston 70 returns to its upper position. A conductor or line 233 extends from a post on the bushing 230 to the terminal $E^1$ of stage E. When the contact stem 231 is engaged by the rod 75, the control grid circuit of stage E is grounded so that tube $125^E$ becomes conductive to energize relay $128^E$. This breaks the connection between terminals $E^2$ and $E^3$, and relay 171 is de-energized so that valve 174 is reversed. Reversal of four-way valve 174 exhausts air pressure from line 690 and cylinder 64, and supplies air under pressure to line 680 and cylinder 63. The resultant actuation of piston 165 shifts the dimpling shoe 47 to an idle position and moves the riveting button or shoe 48 carrying the previously introduced rivet into alignment with the main ram 68. It will be observed that at this time all external relays are de-energized. The machine is now in condition for the riveting operation.

Shifting of the riveting shoe 48 to the active position is immediately followed by downward actuation of the main ram 68. The means for accomplishing this includes a contact 234 carried by an insulating screw 235 threaded through an opening in the end of the right-hand shift cylinder 64 so as to be engageable by the piston of that cylinder when it returns to the outer position. A conductor or line 236 is connected to contact 234 and extends to terminal $F^1$ of stage F. Engagement of the returning piston with contact 234 grounds the control circuit of stage E to render the tube $125^E$ conductive so that relay $128^E$ is energized. In accordance with the invention, this re-energizes or reverses the four-way valves 180 and 193. The means for accomplishing this operation includes a relay 238 having a blade 239 interposed in a line 240 extending from the A. C. power line 197 to one pole of the solenoid operated valve 180. The relay has a second blade 241 in a line 242 extending from the A. C. power line 197 to the line 196 of the solenoid operated valve 193. A conductor 243 extends from the terminal $F^4$ of stage F to the winding of relay 238 so that energization of relay $128^E$ energizes relay 238 and operates valves 180 and 193. In accordance with the previous description of operation, actuation of the valves 180 and 193 supplies air under pressure to the upper end of the main cylinder 69 through the medium of the diaphragm valve 104. This operates the ram 68 downwardly to drive or upset the rivet releasably held in the shoe 48. As shown in Figure 7, the rivet is passed through the punched opening in the work W and its shank is upset against the upper end of the punch 20 and the surface of die 17.

The invention provides adjustable means for accurately determining the depth of the rivet and for initiating the next stage of operation. This means includes what we will term a rivet depth contact 244 positioned to be engageable by the main piston 70. A tubular thumb screw 245 is threaded through a bushing 246 in the insulating plate 198 and passes freely into the lower end of the cylinder 69, as best shown in Figure 6. The rivet depth contact 244 is in the nature of an elongate stem shiftable in the screw 245 and provided with heads at its upper and lower ends. A spring 247 is engaged between the upper head of the contact and the screw 245 to urge the contact to its upper position projecting a considerable distance beyond the screw. The contact 244 is at a lower elevation than the dimple depth contact stem 201 and is not engaged during the dimpling stroke of the ram 68. As the piston 70 moves downwardly during the riveting stroke, it engages and depresses the stem 201, but at this time the circuits associated with the stem are idle. A lead 248 extends from a screw or post on a bushing 246 to the terminal $G^1$ of electronic stage G. When the piston 70 engages the stem 244, the control grid circuit of tube $125^G$ is grounded and the tube is made conductive. This energizes relay $128^G$ so that its blade $133^G$ moves out of engagement with terminal $G^2$. As a result, the circuit to terminal $F^3$ and line 243 is broken to de-energize relay 238. This de-energizes or reverses valves 180 and 193 so that the diaphragm valve 104 operates to cut off the air supply to the main cylinder 69 and to exhaust air therefrom. The spring 77 restores the piston 70 and ram 68 to their upper positions. It will be observed that the operator may accurately time the operation just described by adjusting the thumb screw 245 and thereby regulate or determine the depth of the driven rivet. Upon operation of stage G, the blade $133^G$ of its relay $128^G$ moves out of engagement with terminal $G^2$. This clears D. C. current from all external relays 171, 177, 191, 206 and 238.

The reset stage H of the electronic system is operated substantially simultaneously with return of the ram 68. The switch $138^H$ of stage H is closed at all times, and upon energization of relay $128^G$, as above described, timing circuit $137^H$ and $140^H$ times-out the tube 142 of stage H. When the charge in condenser $140^H$ is reduced to a given degree, the tube 142 becomes conductive to energize relay 148. Operation of relay 148 breaks the D. C. circuit 120—150 to de-energize the relays 113, 128, $128^C$ to $128^G$ inclusive, of the electronic system. The contactor of relay 148 moves to the pole 149 to apply full negative bias voltage to the condensers 124, 140 and $140^C$ to $140^G$ inclusive through the medium of contactors 136 to $136^G$ and 115, to prevent the tubes of the several stages from becoming conductive when voltage is again applied to the system. Thus the electronic system is fully restored for the next operation.

The machine may be conditioned to perform given individual operations or a sequence of selected operations short of a full sequential cycle. For example, the machine may be set to dimple the work W and punch an opening therein for the subsequent reception of a rivet. The above mentioned selector switch 162 is embodied in the external circuit to provide for the performance of selected operations or sequence of operations. The selector switch includes the previously mentioned blade 164, and additional blades 250, 251 and 252. Figure 11 shows the selector switch in position for a full sequence cycle of the machine. When desired to only dimple and punch the work W, the selector switch is moved to a position where its blades 250, 251 and 252 function as described below.

In considering the following description of operation where the machine is employed for dimpling and punching only or for rivet inserting and driving only, the relationship between the resistances in the control grid circuits of the several electronic stages is of importance. When the relay 128 is of a given stage is open or in the initial position, the resistance in the circuit from the condenser 140 to the line 110 is less than the resistance in the circuit from the condenser to the terminal $B^1$, $C^1$, $D^1$, etc., as the case may be. Accordingly, the tube 125 is not made conductive, even though this terminal is grounded by the operation of some external element of the machine. The relay 128 of a preceding electronic stage must be energized or closed to render the tube 125 conductive by the grounding of the control grid circuit through the related terminal $B^1$, $C^1$, $D^1$, etc. The resistance 127 adjacent the terminal is of such a value that upon grounding of the circuit, the related tube 125 is made conductive almost immediately by bleeding off the charge in the associated condenser 140.

The dimpling and punching cycle is initiated in the same manner as the full sequential cycle by closing switches 154, 155 and 159. This results in operation of electronic stage A to shift dimple die 47 into position between die 17 and ram 68. Stage B then operates automatically to supply air under pressure to the upper end of the main cylinder 69 to move the ram downwardly whereby a dimple is formed in the work W by the dies 17 and 50. The dimple depth contact 201 is engaged by the piston 70 to operate stage C at the completion of the dimpling operation. Actuation of stage C maintains air pressure in the main cylinder 69 and causes air under pressure to be supplied to cylinder 28 to actuate the punch 20. The punch 20 forms an opening in the material held by the dies 17 and 50. At the completion of the punching operation, lever 32 engages contact 224 to energize or fire electronic stage D, which in turn effects the return of the ram 68 and punch 20 to their idle positions. Piston 70 comes into engagement with contact 231 as the ram approaches its uppermost position, and electronic stage E is operated. This causes the rivet shoe 48 to move into position between the ram 68 and die 17. However, there is no rivet contained in the shoe 48 at this time, and the shoe is not brought into operation during the dimpling and punching sequence. Blade 252 of the selector switch 162 is connected between a lead 254 extending from power line 197 and a line 255 extending to one side of the solenoid operated three-way valve 93. When the selector switch is positioned for dimpling and punching only, the blade 252 closes the circuit just mentioned to operate the valve 93 to a position where the air pressure supply is cut off from the rivet gate cylinder 90. The rivet gate 85 is thus held in a position where rivets cannot feed into the shoe 48.

Electronic stage F is grounded by the selector switch to fire immediately upon the operation of the electronic stage E, and before the right-hand shifting piston engages contact 234. Electronic stage G is also fired immediately. Contact 251 of the selector switch is at this time positioned to ground a tap 256 from the line 248 extending to terminal $G^1$. Electronic stage G clears all the external relays of the system and serves to time-out tube 142 of stage H through circuit 137$^G$, 135$^G$ and 140$^H$. This clears out the electronic circuits for the succeeding operation.

When the machine is to be used to insert rivets in previously dimpled and punched openings in the workpiece and then to drive the rivets, the selector switch 162 is moved to the "rivet only" position where the blades 146, 250 and 251 control the related circuits. In carrying out the "rivet only" operation, electronic stage A is operated by closing switch 154 and the other switches in the initiating circuit. This fires or operates stage A as above described. With selector switch 162 in the "rivet only" position, the blade 164 engages a terminal to place a resistor 260 in the circuit 165 which connects terminal $B^1$ and contact 166 at the left-hand shift cylinder 63. The resistor 260 is of such a value that it delays firing of tube 125 of stage B for a sufficient time to allow the rivet to drop into the shoe 48 from the passage 87. The automatic "rivet only" cycle is substantially reduced in time by reason of the fact that stages C and D are immediately grounded out, as will be described below. This shortening of the cycle of operation is compensated for by the delay in the firing of stage B effected by resistor 260, and the rivet is given ample time to fall into the rivet shoe before the shoe is shifted. Engagement of shift piston 65 with contact 166 results in firing of stage B as described above. This conditions stage C for operation, and blade 250 of the selector switch 162 grounds line 203 so that stage C fires immediately. This conditions stage D, which also fires immediately because blade 251 of the selector switch grounds line 225 leading to the terminal $D^1$. Thus stages C and D are operated in rapid succession and do not depend upon external circuit conditions established by machine operation for their actuation. Stage E of the electronic system operates as above described to cause the rivet shoe 48 carrying the rivet to be shifted into position in line with the main ram 68. Stage F then operates as previously described to actuate the main ram, and the rivet is driven. Electronic stage G operates at the completion of the rivet driving operation by reason of the engagement of piston 70 with the rivet depth contact 244 and actuation of stage G causes the main piston and ram 68 to return to their upper positions. Re-set stage H operates as in the previously described cycles, and the system is restored to the normal condition for the next "rivet only" sequence. The machine may be repeatedly operated to insert and drive rivets in previously dimpled and punched openings by merely actuating the foot switch 154.

Switches 121, 138 and 138$^C$ to 138$^F$ inclusive may be omitted if desired. However, they are illustrated in the preferred embodiment of the invention to indicate that the successive stages of the electronic system may be timed out to perform or permit the performance of special or selected machine operations as conditions may require.

From the above detailed description it will be seen that we have provided a fully automatic riveting machine that may be employed to carry out a complete sequence of operations, including the dimpling and punching of the work parts, the insertion of the rivets and the driving of the rivets. The machine may also be set to simply dimple and punch the work parts or to insert rivets in previously dimpled and punched openings and then drive the inserted rivets. Thumb screw 200 may be easily adjusted to regulate the depth of the dimples to be formed in the workpieces, and thumb screw 245 may be manipulated to regulate the depth of the rivets. The thumb screws 200 and 245 are located where they are conveniently accessible to the operator, and adjustment of the machine may be accomplished without any delay whatsoever. It is to be observed that the several primary or active elements of the machine are directly operated by cylinder and piston mechanisms, and there are no intervening linkages subject to wear and malfunctioning. The electronic control system assures properly timed sequential operation of the several machine parts and is such that simple setting of the selector switch 162 conditions the machine either for the performance of the full cycle of operations or for dimpling and punching only, or riveting only. The invention provides a trouble-free fully automatic machine capable of rapidly carrying out its several functions.

Having described only a typical form of the invention, we do not wish to be limited to the specific details herein set forth, but wish to reserve to ourselves any variations or modifications that may appear to those skilled in the art and/or fall within the scope of the following claims.

We claim:

1. An electronic control for a machine having a plurality of moving parts comprising an initiating stage including a tube having a plate circuit and a grid circuit, a relay connected in the plate circuit to be energized when the tube becomes conductive, a negative bias potential source, a connection between said source and the grid circuit to provide a bias to hold the tube non-conductive, manually operable means controlling said connection to reduce said bias on the grid circuit and thus render the tube conductive, actuating means for moving one of said machine parts, an operating circuit completed upon actuation of said relay to cause operation of said actuating means, at least one intermediate stage including a tube having a plate circuit and a grid circuit, a connection between the grid circuit of the second named tube and said source controlled by said relay to apply a bias to said second tube to hold said second tube non-conductive so long as the relay remains unactuated, a condenser connected in parallel with the last named connection in the region between the grid of the second named tube and the relay retaining a charge to hold said second tube non-conductive when said relay has operated, a lead connected with said last named connection having contact means closed by movement of said machine part to connect said lead with ground to provide a path to discharge the charge in said condenser and thus make said second tube conductive, means for moving a second machine part, an operating circuit for the last named means, and a relay connected with the plate circuit of said second tube and closing the last named circuit when said second tube becomes conductive.

2. An electronic control for a machine having a plurality of moving parts comprising an initiating stage including a tube having a plate circuit and a grid circuit, a relay connected in the plate circuit to be energized when the tube becomes conductive, a source of negative bias potential, a circuit between said source and the grid circuit to provide a bias to hold the tube non-conductive, manually operable means controlling said circuit to reduce said bias on the grid and thus render the tube conductive, actuating means for moving one of said machine parts, an operating circuit completed upon actuation of said relay to cause operation of said actuating means, at least one intermediate stage including a tube having a plate circuit and a grid circuit, a connection between the grid circuit of the second named tube and said source controlled by said relay to apply a bias to said second tube to hold the same non-conductive so long as the relay remains unactuated, a condenser connected in parallel in the last named connection for retaining a bias charge to hold said second tube non-conductive when said relay has operated, a lead connected with said last named connection having ground contact means arranged to be closed by movement of said machine part to provide a path through said lead to ground for the discharge of said condenser to make said second tube conductive, means for moving a second machine part, an operating circuit for the last named means, a relay connected with the plate circuit of said second tube and closing the last named circuit when said second tube becomes conductive, and resetting means operated upon movement of a third moving part for restoring said relays to their initial positions.

3. An electronic control for a machine having a plurality of moving parts comprising a source of negative potential, an initiating stage including a tube having a plate circuit and a grid circuit, means for providing a negative cut off bias in the grid circuit to hold the tube non-conductive including an initiating circuit connected with the grid circuit and said source, a discharge condenser, and manually operable means for connecting said condenser with the initiating circuit to bleed sufficient bias potential from the grid to render the tube conductive, a relay connected in the plate circuit to be made operative when the tube becomes conductive, an operating circuit completed by actuation of said relay to cause movement of one of said parts, a second stage comprising a second tube having a plate and a control grid, a control circuit extending from said source to the grid of the second tube to hold the second tube non-conductive, normally closed contact means in the control circuit at said relay to be opened upon operation of the relay, a timing condenser connected in parallel in said control circuit in the region between said contact means and said second tube retaining a bias charge sufficient to hold said second tube non-conductive when said contact means is opened, a lead connected with the control circuit constituting a path to bleed said charge from the timing condenser, normally open contact means in said lead closed by movement of said part to allow the charge in the second mentioned condenser to bleed off through said lead to render the second tube conductive, means connected with the plate circuit of the second tube to be energized when the second tube is made conductive, and an operating circuit completed by actuation of the last named means.

4. An electronic control for a machine having a plurality of moving parts comprising a source of negative potential, an initiating stage including a tube having a plate circuit and a grid circuit, means for providing a negative cut off bias in the grid circuit to hold the tube non-conductive including an initiating circuit connected with the grid circuit and said source, a discharge condenser, and manually operable means for connecting said condenser with the initiating circuit to bleed sufficient bias potential from the grid to render the tube conductive, a relay connected in the plate circuit to be made operative when the tube becomes conductive, an operating circuit completed by actuation of said relay to cause movement of one of said parts, a second stage comprising a second tube having a plate and a control grid, a control circuit extending from said source to the grid of the second tube to hold the second tube non-conductive, normally closed contact means in the control circuit at said relay to be opened upon operation of the relay, a timing condenser connected in parallel in said control circuit in the region between said contact means and said second tube retaining a bias charge sufficient to hold said second tube non-conductive when said contact means is opened, a lead connected with the control circuit constituting a path to bleed said charge from the timing condenser, normally open contact means in said lead closed by movement of said part to allow the charge in the second mentioned condenser to bleed off through said lead to render the second tube conductive, second relay means connected with the plate of the second tube to be energized when the second tube is made conductive, an operating circuit completed by said second relay means upon energization of the same to cause movement of a second machine part, a third stage comprising a third tube having a plate and a grid, a second control circuit extending from said source to the grid of the third tube to apply a bias to the latter to normally hold the third tube non-conductive, normally closed second contact means in said second control circuit at said second relay means to be opened when said second relay means is energized, a second timing condenser connected in parallel in said second control circuit in the region between the third tube and said second contact means for retaining a bias charge sufficient to hold said third tube non-conductive when said second contact means is opened, a second lead connected with said second control circuit, third contact means in said second lead closed by movement of said second machine part to provide a path through said second lead through which the charge in said second timing condenser bleeds off to render said third tube conductive, and relay means connected with the plate of the third tube to be energized to cause movement of a third machine part when the third tube is made conductive.

5. An electronic control for a machine having a plurality of moving parts comprising a source of negative potential, an initiating stage including a tube having a plate circuit and a grid circuit, means for providing a negative cut off bias in the grid circuit to hold the tube non-conductive including an initiating circuit connected with the grid circuit and said source, a discharge condenser, and manually operable means for connecting said condenser with the initiating circuit to bleed sufficient bias potential from the grid to render the tube conductive, a relay connected in the plate circuit to be made operative when the tube becomes conductive, an operating circuit completed by actuation of said relay to cause movement of one of said parts, a second stage comprising a second tube having a plate and a control grid, a control circuit extending from said source to the grid of the second tube to hold the second tube non-conductive, normally closed contact means in the control circuit at said relay to be opened upon operation of the relay, a timing condenser connected in parallel in said control circuit in the region between said contact means and said second tube retaining a bias charge sufficient to hold said second tube non-conductive when said contact means is opened, a grounded adjustable potentiometer, a contact at said relay connected with the potentiometer and engaged by said contact means when said relay is operated to electrically connect the potentiometer with said control circuit to provide a resistance path for conducting away the charge in said timing condenser and thus delay firing of said second tube, a relay means in the plate circuit of said tube energized when said second tube is fired, and an operating circuit completed by actuation of the last named relay.

6. An electronic control for a machine having a plurality of moving parts comprising a source of negative potential, an initiating stage including a tube having a plate circuit and a grid circuit, means for providing a negative cut off bias in the grid circuit to hold the tube non-conductive including an initiating circuit connected with the grid circuit and said source, a discharge condenser, and manually operable means for connecting said condenser with the initiating circuit to bleed sufficient bias potential from the grid to render the tube conductive, a relay connected in the plate circuit to be made operative when the tube becomes conductive, an operating circuit completed by actuation of said relay to cause movement of one of said parts, a second stage comprising a second tube having a plate and a control grid, a control circuit extending from said source to the grid of the second tube to hold the second tube non-conductive, normally closed contact means in the control circuit at said relay to be opened upon operation of the relay, a timing-out condenser and a resistor connected in parallel in said control circuit in the region between said contact means and said second tube, the condenser being operable to retain a bias charge to hold said second tube non-conductive when said contact means is opened, a lead connected with the control circuit in a region to be in electrical connection with the timing condenser after opening of said contact means, normally open contact means in said lead closed by movement of said part to ground the lead and thus provide a discharge path for the charge in said timing condenser whereby the second tube is made conductive by movement of said part, a relay in the plate circuit of said second tube energized when the second tube becomes conductive, and an operating circuit completed by actuation of the last named means.

7. A control for a machine having movable parts to be actuated comprising a source of negative bias potential, a first stage including an operating circuit for causing operation of a first movable part, a relay controlling said operating circuit, a tube having a plate and a control grid, a connection between the plate and said relay for energizing the relay, a control circuit from said source to the grid applying a negative bias to the grid to hold the tube non-conductive, manually conditioned means for bleeding sufficient negative bias potential from the grid to make the tube conductive and thus energize the relay to cause actuation of said first part, a second stage including a second actuating circuit for causing actuation of a second movable part, a second relay for controlling said second circuit, a second tube having a plate and a control grid, a connection between the plate of the second tube and said second relay, a second control circuit from said source to the grid of the second tube applying a negative bias to the grid to hold the second tube non-conductive, the first mentioned relay including contactor means in said second control circuit normally completing the same and opening said second control circuit when the first mentioned relay is energized, a condenser connected in parallel with the second control circuit for holding a bias charge sufficient to hold the second tube non-conductive after actuation of the first mentioned relay, a ground bleed line connected with said second mentioned control circuit including a normally open contact closed by movement of said first part to bleed said charge from the timing condenser to make the second tube conductive, and a manually conditioned timing out means for timing out the second tube when movement of said first part is not to be employed as the timing factor, said timing out means including a grounding lead, an adjustable potentiometer in said lead, a contact on said lead engaged by said contactor means when said first mentioned relay is operated so as to connect said lead in said second control circuit, and a normally open manually closable switch in said lead, the charge in said condenser bleeding to ground through said lead when said switch is closed.

References Cited in the file of this patent

UNITED STATES PATENTS

| Number | Name | Date |
|---|---|---|
| 2,207,055 | Goodling | July 9, 1940 |
| 2,422,020 | Kingsmill | June 10, 1947 |

OTHER REFERENCES

"Electronics," July 1950, pages 70-73.